United States Patent
Hu et al.

(10) Patent No.: US 9,918,305 B2
(45) Date of Patent: Mar. 13, 2018

(54) ENHANCED SYSTEM INFORMATION DECODING

(71) Applicant: QUALCOMM Incorporated, San Diego, CA (US)

(72) Inventors: An-Swol Clement Hu, Belmont, CA (US); Jittra Jootar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 242 days.

(21) Appl. No.: 14/336,738

(22) Filed: Jul. 21, 2014

(65) Prior Publication Data

US 2015/0099528 A1    Apr. 9, 2015

Related U.S. Application Data

(60) Provisional application No. 61/886,779, filed on Oct. 4, 2013.

(51) Int. Cl.
*H04W 72/00*    (2009.01)
*H04W 72/04*    (2009.01)
(Continued)

(52) U.S. Cl.
CPC ......... *H04W 72/042* (2013.01); *H04L 5/0044* (2013.01); *H04W 72/02* (2013.01); *H04W 88/06* (2013.01); *H04W 72/04* (2013.01)

(58) Field of Classification Search
CPC ... H04W 72/042; H04W 72/02; H04W 88/06; H04L 5/0044
See application file for complete search history.

(56) References Cited

U.S. PATENT DOCUMENTS

2011/0014877 A1* 1/2011 Cho .............. H04W 48/08
                                                         455/70
2012/0190362 A1 7/2012 Subbarayudu et al.
(Continued)

FOREIGN PATENT DOCUMENTS

EP    2 605 562 A2    6/2013
EP    2605562 A2 *    6/2013  ............ H04W 8/183

OTHER PUBLICATIONS

Ericsson: "Dual-SIM Dual-Standby UEs and their impact on the RAN", 3GPP Draft; R2-115375 Dual-SIM Dual-Standby UES and Their Impact on the RAN, 3rd Generation Partnership Project (3GPP), Mobile Competence Centre ; 650, Route Des Lucioles ; F-06921 Sophia-Antipolis Cedex ; France, vol. RAN WG2, No. Zhuhai; Oct. 10, 2011, Oct. 3, 2011 (Oct. 3, 2011), XP050540879, [retrieved on Oct. 3, 2011] (3 pages).
(Continued)

*Primary Examiner* — Kathy Wang-Hurst
*Assistant Examiner* — Said Elnoubi
(74) *Attorney, Agent, or Firm* — Arent Fox, LLP

(57) ABSTRACT

Methods and apparatus for decoding system information include determining a maximum repetition rate duration based at least in part on a master information block (MIB). The methods and apparatus further include generating a distributed system information block (SIB) decoding scheme for allocating radio frequency resources between a first subscriber identity module (SIM) and a second SIM. In some aspects, the distributed SIB decoding scheme includes a partitioned SIB decoding schedule for the maximum repetition rate duration and based at least in part on a continuous SIB decoding period. Additionally, the methods and apparatus include attempting to decode one or more SIBs during the maximum repetition rate duration according to the distributed SIB decoding scheme.

17 Claims, 8 Drawing Sheets

(51) Int. Cl.
*H04W 88/06* (2009.01)
*H04L 5/00* (2006.01)
*H04W 72/02* (2009.01)

(56) References Cited

U.S. PATENT DOCUMENTS

| | | |
|---|---|---|
| 2013/0189985 A1 | 7/2013 | Mutya et al. |
| 2013/0201884 A1* | 8/2013 | Freda ................. H04W 72/005 370/278 |
| 2013/0208673 A1* | 8/2013 | Petermann ............ H04W 48/10 370/329 |
| 2013/0260761 A1 | 10/2013 | Walke et al. |
| 2013/0303240 A1 | 11/2013 | Sanka et al. |
| 2014/0036838 A1 | 2/2014 | Yoo et al. |
| 2014/0051426 A1 | 2/2014 | Siomina et al. |
| 2014/0071957 A1 | 3/2014 | Xu et al. |
| 2014/0112180 A1* | 4/2014 | Axmon ................. H04W 24/10 370/252 |
| 2014/0169347 A1* | 6/2014 | Lamazure ............ H04B 17/382 370/337 |

OTHER PUBLICATIONS

International Search Report and Written Opinion—PCT/US2014/058395—ISA/EPO—dated Feb. 2, 2015 (13 pages).

* cited by examiner

ENHANCED SYSTEM INFORMATION DECODING

CLAIM OF PRIORITY

The present Application for Patent claims priority to Provisional Application No. 61/886,779 entitled "METHODS AND APPARATUS FOR ENHANCED SYSTEM INFORMATION DECODING" filed Oct. 4, 2013, which is assigned to the assignee hereof and hereby expressly incorporated by reference herein.

BACKGROUND

Aspects of the present disclosure relate generally to wireless communication systems, and more particularly, to enhanced system information decoding in a wireless communication system.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

In some wireless communication networks, ineffective utilization of available communication resources, particularly decoding resources for handover, reselection and/or redirection may lead to degradations in wireless communication. Even more, the foregoing resource underutilization inhibits user equipments and/or wireless devices from achieving higher wireless communication quality. Thus, improvements in system information decoding are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of decoding system information includes determining a maximum repetition rate duration based at least in part on a master information block (MIB). The method further includes generating a distributed system information block (SIB) decoding scheme for allocating radio frequency resources between a first subscriber identity module (SIM) and a second SIM, wherein the distributed SIB decoding scheme includes a partitioned SIB decoding schedule for the maximum repetition rate duration and based at least in part on a continuous SIB decoding period. Additionally, the method includes attempting to decode one or more SIBs during the maximum repetition rate duration according to the distributed SIB decoding scheme.

In another aspect, a computer-readable medium storing computer executable code includes code executable to determine a maximum repetition rate duration based at least in part on a master information block (MIB). The computer-readable medium storing computer executable code further includes code executable to generate a distributed system information block (SIB) decoding scheme for allocating radio frequency resources between a first subscriber identity module (SIM) and a second SIM, wherein the distributed SIB decoding scheme includes a partitioned SIB decoding schedule for the maximum repetition rate duration and based at least in part on a continuous SIB decoding period. Additionally, computer-readable medium storing computer executable code includes code executable to attempt to decode one or more SIBs during the maximum repetition rate duration according to the distributed SIB decoding scheme.

In a further aspect, an apparatus for decoding system information includes means for determining a maximum repetition rate duration based at least in part on a master information block (MIB). The apparatus further includes means for generating a distributed system information block (SIB) decoding scheme for allocating radio frequency resources between a first subscriber identity module (SIM) and a second SIM, wherein the distributed SIB decoding scheme includes a partitioned SIB decoding schedule for the maximum repetition rate duration and based at least in part on a continuous SIB decoding period. Additionally, the apparatus includes means for attempting to decode one or more SIBs during the maximum repetition rate duration according to the distributed SIB decoding scheme.

In an additional aspect, an apparatus for decoding system information includes a system information component configured to determine a maximum repetition rate duration based at least in part on a master information block (MIB). The system information component is further configured to generate a distributed system information block (SIB) decoding scheme for allocating radio frequency resources between a first subscriber identity module (SIM) and a second SIM, wherein the distributed SIB decoding scheme includes a partitioned SIB decoding schedule for the maximum repetition rate duration and based at least in part on a continuous SIB decoding period. Additionally, the system information component is configured to attempt to decode one or more SIBs during the maximum repetition rate duration according to the distributed SIB decoding scheme.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings, in which like reference characters identify like subject matter throughout, wherein dashed lines may represent an optional element, and wherein.

DETAILED DESCRIPTION

Figure 1:
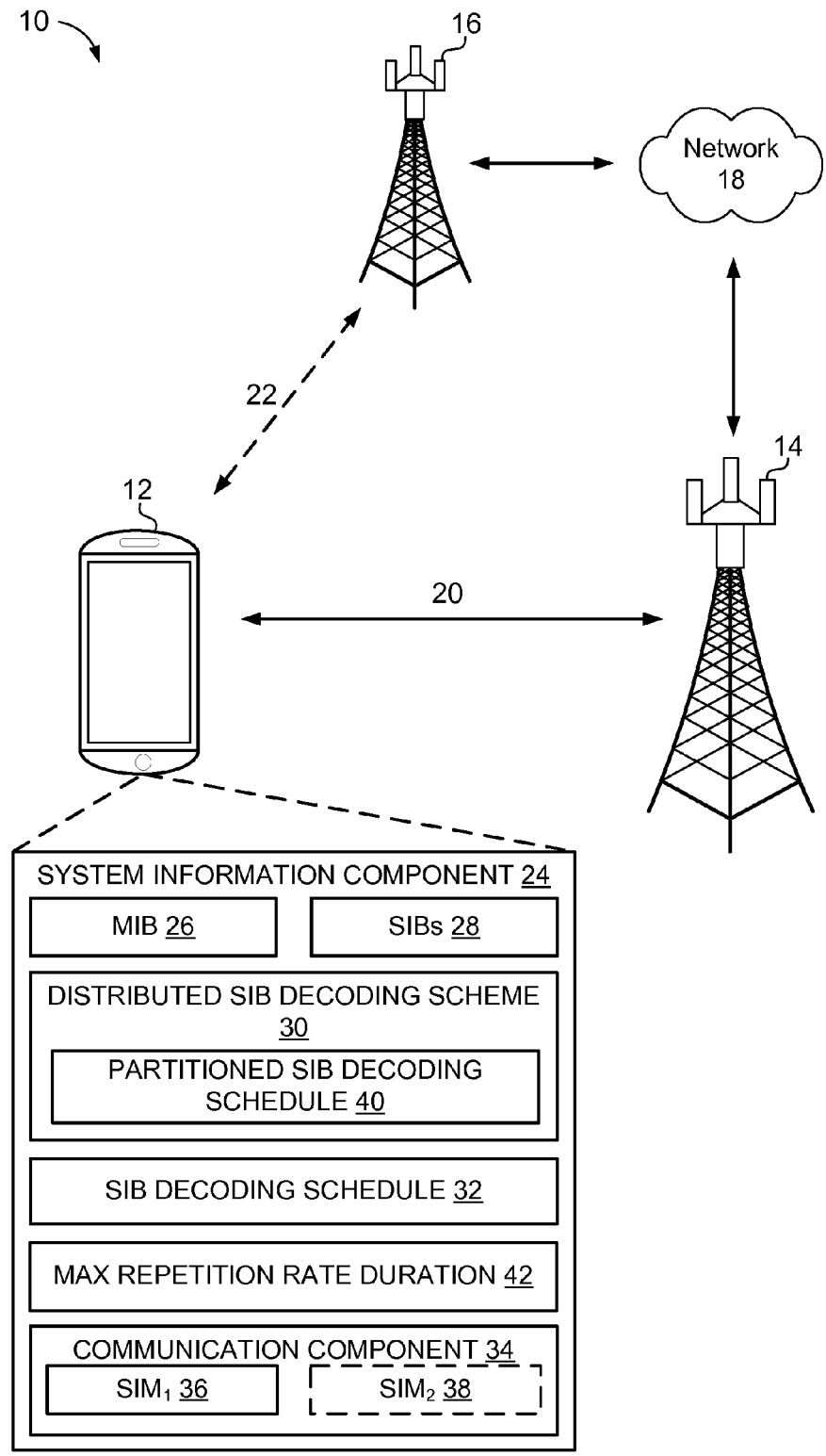
FIG. 1 is a schematic diagram of a communication network including an aspect of a user equipment that may decode system information while maintaining an active call, for example, according to the system information component.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, as used herein, the term "component" as used herein may be one of the parts that make up a system, may be hardware or software, and may be divided into other components.

The present aspects generally relate to enhanced system information decoding for dual subscriber identity module (SIM) dual standby (DSDS) user equipments (UEs). Specifically, a DSDS UE may support activity on at least two SIMs by sharing radio frequency resources (e.g., RF chain) between or among the two SIMs. For example, the DSDS UE may engage in an active data call on one SIM (e.g., active SIM) while continuing to monitor one or more channels (e.g., paging channel) on the other SIM (e.g., idle SIM). To accomplish such aspects, the DSDS UE may switch radio frequency resources from the active data call to the channel monitoring. In other words, in switching radio frequency resources, the DSDS UE may "tune-away" from the active data call of the one SIM for defined periods of time in order to monitor the one or more channels on the other SIM.

The foregoing tune-away may degrade the data throughput performance on the active SIM (e.g., $SIM_1$ 36). Even more, such degradations are notable or at least more likely to occur during relatively longer tune-away durations. In the foregoing scenario, the long tune-away durations may lead to call drop. One such tune-away scenario that may have an extended tune-away duration is during cell reselection on the idle SIM (e.g., $SIM_2$ 38). During cell reselection, the idle SIM (e.g., $SIM_2$ 38) may receive and decode system information associated with the new cell. However, a complete decoding of the system information may take an extended tune-away duration, which may likely result in a call drop on the active SIM (e.g., $SIM_1$ 36).

As such, in order to efficiently decode the system information on or for the idle SIM (e.g., $SIM_2$ 38) during a long tune-away, for instance, during cell reselection on the idle SIM (e.g., $SIM_2$ 38), while maintaining the active call on or for the active SIM (e.g., $SIM_1$ 36), the DSDS UE may allocate decoding periods for the idle SIM (e.g., $SIM_2$ 38) that may be shorter in duration than a network specified decoding period. Accordingly, in some aspects, the present methods and apparatuses may provide an efficient solution, as compared to current solutions, to allocate resources in a DSDS UE for both system information processing/decoding on one SIM and for maintaining an active data call on another SIM.

Referring to FIG. 1, in an aspect, a wireless communication system 10 includes at least one UE 12 in communication coverage of at least a first network entity 14 and a second network entity 16. UE 12 may communicate with network 18 via one or both of first network entity 14 and second network entity 16. In some aspects, multiple UEs including UE 12 may be in communication coverage with one or more network entities, including first network entity 14 and second network entity 16. For instance, UE 12 may communicate with first network entity 14 on or using one or more communication channels 20.

Further, in an optional aspect, for example, UE 12 may communicate with second network entity 16 on or using one or more communication channels 22. It should be understood that UE 12 may communicate with one or more cells included or deployed at one or both first network entity 14 and second network entity 16. In an example, UE 12 may transmit and/or receive wireless communication to and/or from first network entity 14 and/or second network entity 16. For example, such wireless communication may include messages such as, but not limited to, one or more master information blocks 26 (MIBs) and/or one or more system information blocks 28 (SIBs) that may include system information including parameters to enable UE 12 to perform cell reselection.

As used herein, the term "cell reselection" may refer to a process in which UE 12 evaluates the quality of the current cell on which it is camped as well as neighboring cells, and includes a decision to remain camping on that cell or a decision to reselect to a new cell (e.g., one of the evaluated neighboring cells), referred to as a target cell. This evaluation process may be standardized through use of standard cell reselection parameters, which may be broadcast in one or more SIBs 28.

The UE 12 may acquire scheduling information for the one or more SIBs 28 from one or more MIBs 26. If UE 12 decides to reselect to a new cell, e.g., the target cell, then UE 12 may read the system information (e.g., one or more MIBs 26 and one or more SIBs 28) broadcasted by the target cell, and use the acquired information to access the target cell. In an aspect, the term cell reselection may refer to the term of the same name as recited in one or more 3GPP Technical Specifications, such as 3GPP TS 25.331.

Additionally, UE 12 may be a DSDS UE, in that UE 12 may communicate using or according to at least two SIMs, where each of the SIMs have a different subscription to the same wireless network or to a different wireless network. For example, UE 12 may communicate with one or more cells of first network entity 14 using at least one of $SIM_1$ 36 and $SIM_2$ 38. Likewise, UE 12 may communicate with first network entity 14 using one SIM (e.g., $SIM_1$ 36) and may communicate with second network entity 16 using a second SIM (e.g., $SIM_2$ 38).

As used herein, the term "SIM" may include, but is not limited to, a physical smart card or a logical application or subscriber identity module, such as an application on a smart card or on a universal integrated circuit card (UICC), which includes wireless network subscription information (such as but not limited to a subscriber profile having a unique identification number (e.g., to identify the subscriber or owner of the subscription), a phone number, and details about subscribed services and features), and, optionally, other network-specific and/or personal data (e.g., contact information) that may be used in establishing communication with a wireless network and/or in operating UE 12 on the wireless network.

In some aspects, UE 12 may be conducting an active call on one SIM (e.g., $SIM_1$ 36) while attempting or initiating cell reselection on another SIM (e.g., $SIM_2$ 38). For example, UE 12 may attempt or initiate cell reselection from a cell of first network entity 14 to another cell of first network entity 14 or to a cell of second network entity 16 for $SIM_2$ 38. In such a non-limiting scenario, $SIM_2$ 38 may be considered an idle mode SIM which monitors channels for at least paging information.

As such, UE 12 may tune-away from the SIM with the active call (e.g., $SIM_1$ 36) in order to receive and/or decode system information (e.g., MIB 26 and/or SIBs 28) during cell reselection for $SIM_2$ 38. As used herein, the term "tune-away" may refer to a procedure in which UE 12 switches a portion of all of the radio frequency resources of a communication component 34 from communication based on a first subscription, e.g., of $SIM_1$ 36, to be used instead to communicate based on a second subscription, e.g., of $SIM_2$ 38.

In an aspect, communication component 34 may have radio frequency resources including, but not limited to, all or some portion of: a transceiver, a receiver, a transmitter, a protocol stack, a set of transmit chain components, a set of receive chain components, a modulator and/or demodulator, a processor, a memory including instructions or code executable by a processor to communicate according to a communication protocol associated with the respective subscription, radio frames in a time domain, etc. In order to prevent or obviate extended tune-away durations that may result in severe degradations of the active call on one SIM, UE 12 may be configured according to the present aspects to continuously and/or cyclically tune away for relatively shorter durations until the system information (e.g., MIB 26 and SIBs 28) have been read/decoded.

According to the present aspects, UE 12 may include system information component 24, which may be configured to decode system information (e.g., MIB 26 and/or SIBs 28) on one SIM (e.g., $SIM_2$ 38) while maintaining an active call on another SIM (e.g., $SIM_1$ 36) by allocating communication resources (e.g., a number of radio frames) between the active SIM (e.g., $SIM_1$ 36) and the idle SIM (e.g., $SIM_2$ 38). For example, system information component 24 may be configured to manage a distribution of a portion of the radio frequency resources of communication component 34 to an active SIM (e.g., $SIM_1$ 36) to maintain an active call (e.g., prevent dropped call) and support a highest available throughput. Additionally, system information component 24 may be configured to manage a distribution of a portion of radio frequency resources of communication component 34 to an idle SIM (e.g., $SIM_2$ 38) to efficiently decode system information, while maintaining the active call on the active SIM (e.g., $SIM_1$ 36). As such, system information component 24 may be configured to adjust (e.g., decrease) a number of consecutive continuous SIB decoding periods so as to allocate at least some of the frames to the active SIM (e.g., $SIM_1$ 36).

In an aspect, system information component 24 may be configured to receive a MIB 26 from one network entity (e.g., first network entity 14 and/or second network entity 16). The MIB 26 may be or otherwise take the form of a block of system information which includes, among other information, a number of parameters that may be useful for a UE's initial access to the network (e.g., network 18), such as, but not limited to, scheduling information of one or more SIBs 28 (e.g., SIB decoding schedule 32), as well as network identities, such as but not limited to a mobile network code (MNC) and mobile country code (MCC), for acquiring a connection to a network entity.

For example, in an aspect, MIB 26 may contain the repetition count, number of segments, System Frame Number (SFN) of the first segment and SFN offset for the remaining segments (if any) for each of the SIBs 28. Sometimes, in addition to MIB 26 there could be scheduling blocks (SB), which contain the information for the rest of the SIBs 28 that have not been included in the MIB 26. In other words, MIB 26 may be used to specify what SIBs 28 are in use at a network entity, and how they are scheduled (e.g., SIB decoding schedule 32). Also, as used herein, SIB 28 may refer to a message periodically broadcast by a network entity, such as first network entity 14 or second network entity 16, which includes various system information and parameters, including system information and parameters related to cell reselection.

The parameters included in one or more SIBs 28 may include, but are not limited to, signal quality thresholds for initiating measurements of the neighboring cell signals, signal quality threshold offsets and hysteresis offsets for triggering reselection to a new cell, and signal quality threshold timers. MIBs 26 and one or more SIBs 28 may broadcasted by a cell, e.g., operated by a network entity, on a broadcast channel, such as but not limited to a broadcast control channel (BCCH) in UMTS. In an aspect, the terms MIB 26, and SIB 28 may refer to the terms of the same name as recited in one or more 3GPP Technical Specifications, such as 3GPP TS 25.331.

In an aspect, system information component 24 may be configured to read or decode SIB decoding schedule 32 from MIB 26, which may provide or which system information component 24 may use to determine a maximum repetition rate duration 42. In an aspect, the maximum repetition rate duration 42 may be a time interval (e.g., a number of frames) equal to a maximum value of the number of frames between repetitions of a SIB from the one or more SIBs 28. In other aspects, the maximum repetition rate duration 42 may be or otherwise indicate a minimum number of frames during which all SIBs 28 scheduled by MIB 26 can be decoded. In other words, the maximum repetition rate duration 42 may be or otherwise indicate a maximum period (e.g., in a number of frames) between repetitions of a SIB. For example, the SIB decoding schedule 32 may be the initial decoding scheme provided by the network allocating at least some communication resources (e.g., radio frames) to the decoding of system information.

Additionally, a problem with prior solutions is that the SIB decoding schedule 32 may cause UE 12 to allocate all radio frequency resources (e.g., radio frames) of communication component 34 during the maximum repetition rate duration 42 to the decoding of system information, e.g., for idle $SIM_2$ 38. However, in these prior solutions, a DSDS UE engaged in an active call on one SIM may experience a degradation in communication quality (e.g., dropped call) when all radio frequency resources are allocated to the decoding of system information during or based on the SIB decoding schedule 32.

In contrast, according to the present aspects, system information component 24 may be configured to distribute the allocation of radio frequency resources (e.g., radio frames) to both an active SIM (e.g., $SIM_1$ 36) engaged in an active call and an idle SIM (e.g., $SIM_2$ 38) engaged in system information decoding based on a distributed SIB decoding scheme 30 that includes a partitioned SIB decoding schedule 40. Partitioned SIB decoding schedule 40 may include, but is not limited to, a balanced allocation of radio frequency resources (e.g., frames) to one or both of an active SIM (e.g., $SIM_1$ 36) for performing or maintaining a data call and an idle SIM (e.g., $SIM_2$ 38) for performing system information decoding based on the SIB decoding schedule 32 provided by the network.

For instance, system information component 24 may be configured to generate or otherwise determine a distributed SIB decoding scheme 30 each including one or more partitioned SIB decoding schedules 40, for example, corresponding to a maximum repetition rate duration 42. In an aspect, the distributed SIB decoding scheme 30 may allocate or reallocate at least a portion of radio frequency resources originally scheduled for the idle SIM (e.g., $SIM_2$ 38) to the active SIM (e.g., $SIM_1$ 36). In an aspect, system information component 24 may be configured to adjust SIB decoding schedule 32 by overlaying or otherwise superimposing a partitioned SIB decoding schedule 40 on top thereof to obtain a distributed SIB decoding scheme 30 that is used by UE 12 in place of SIB decoding schedule 32. In either aspect, the distributed SIB decoding scheme 30 having partitioned SIB decoding schedule 40 may include distributed scheduling information for both the active SIM (e.g., $SIM_1$ 36) and the idle SIM (e.g., $SIM_2$ 38), and UE 12 utilizes distributed SIB decoding scheme 30 instead of the network-provided SIB decoding schedule 32 to allow both of maintaining an active call associated with an active SIM (e.g., $SIM_1$ 36) and decoding of system information associated with an idle SIM (e.g., $SIM_2$ 38).

For example, UE 12 reading or decoding MIB 26 may initially act as a trigger for system information component 24 to generate at least one distributed SIB decoding scheme 30. For example, upon receiving MIB 26, system information component 24 may be configured to generate at least one distributed SIB decoding scheme 30 including partitioned SIB decoding schedule 40 for the maximum repetition rate duration 42. In an aspect, system information component 24 obtains SIB decoding schedule 32 provided by the network from MIB 26, determines the maximum repetition rate duration 42 from the SIB decoding schedule 32, and determines the partitioning and/or distribution of radio frequency resources (e.g., frames) to one or both of the active SIM (e.g., $SIM_1$ 36) and the idle SIM (e.g., $SIM_2$ 38), thereby defining or otherwise obtaining at least one partitioned SIB decoding schedule 40 including at least one continuous SIB decoding period for the idle SIM (e.g., $SIM_2$ 38) and radio frequency resources allotted to the active SIM (e.g., $SIM_1$ 36) during non-SIB decoding periods.

The continuous SIB decoding period may be or otherwise include at least one set of one or more continuous frames within or during the maximum repetition rate duration 42. In other words, the continuous SIB decoding period may be a number of consecutive or continuous frames allocated for a decoding of system information (e.g., on idle SIM). That is, the distributed SIB decoding scheme 30 may allocate one or more continuous SIB decoding periods during the maximum repetition rate duration 42 for at least decoding the one or more SIBs 28. For example, in some aspects, distributed SIB decoding scheme 30 allocates the time during the maximum repetition rate duration 42 not occupied by the continuous SIB decoding periods for the idle SIM (e.g., $SIM_2$ 38) to the active SIM (e.g., $SIM_1$ 36) to conduct or maintain, for example, an active call.

In further aspects, the partitioned SIB decoding schedule 40 may explicitly permit or inhibit reading/decoding of system information for each frame or sets of frames (e.g., a number of frames equal to the continuous SIB decoding period) during the maximum repetition rate duration 42. That is, for each time period formed of a number of consecutive frames equal to the continuous SIB decoding period, partitioned SIB decoding schedule 40 may allocate the reading/decoding of system information for the idle SIM (e.g., $SIM_2$ 38), and the allocation of radio frequency resources to the active SIM (e.g., $SIM_1$ 36) in order to maintain the active call. As such, the partitioned SIB decoding schedule 40 may include one or more continuous SIB decoding periods during times allocated for system information decoding by system information component 24. As such, distributed SIB decoding scheme 30 having partitioned SIB decoding schedule 40 associated with maximum repetition rate duration 42 may include one or more continuous SIB decoding periods of uniform or non-uniform duration.

For example, the partitioned SIB decoding schedule 40 may include a SIB decoding bit which may permit decoding of the one or more SIBs during the continuous SIB decoding period and/or an absence of the SIB decoding bit for inhibiting the decoding of the one or more SIBs during the continuous SIB decoding period. In other aspects, the partitioned SIB decoding schedule 40 may include a SIB decoding bit for permitting decoding of the one or more SIBs during the continuous SIB decoding period and/or an absence of the SIB decoding bit for permitting a data call during an adjusted continuous SIB decoding period. In such aspects, the adjusted continuous SIB decoding period may be a time duration allocated for the data call between the continuous SIB decoding periods of the idle SIM (e.g., $SIM_2$ 38).

In additional aspects, the partitioned SIB decoding schedule 40 may include at least one or both of a SIB decoding bit for permitting decoding of the one or more SIBs during the maximum repetition rate duration 42 continuous SIB decoding period and an absence of the SIB decoding bit for inhibiting the decoding of the one or more SIBs during the maximum repetition rate duration 42. In such aspects, the SIB decoding bit may indicate the continuous SIB decoding period.

Further, system information component 24 may be configured to generate distributed SIB decoding scheme 30 having a number of partitioned SIB decoding schedules 40 according to one or more configurable values. For instance, the number of partitioned SIB decoding schedules 40 may be equal to an extension factor value indicating a period of time represented as an integer in which the distributed SIB decoding scheme 30 may need to complete the decoding relative to the SIB decoding schedule 32. For example, the extension factor may be a ratio of the minimum number of frames required to ensure the occurrence of all SIBs according to one or more partitioned SIB decoding schedules 40 and the minimum number of frames required to ensure the occurrence of all SIBs according to SIB decoding schedule 32.

As an example not to be construed as limiting, system information component 24 may be configured to generate distributed SIB decoding scheme 30 having two partitioned SIB decoding schedules 40, where the extension factor value is determined to be equal to an integer of two (e.g., distributed SIB decoding scheme 30 is determined to need twice as long as the SIB decoding schedule 32). As such, distributed SIB decoding scheme 30 having the two partitioned SIB decoding schedules 40 may be configured to read/decode one or more SIBs 28 during each of two maximum repetition rate durations 42. That is, distributed SIB decoding scheme 30 may be configured to allocate a portion of the SIB reading/decoding time, e.g., as allocated by the network-provided SIB decoding schedule 32, to be distributed across more than one maximum repetition rate duration 42.

Further, continuing with the above example, during a maximum repetition rate duration 42, the respective or associated distributed SIB decoding scheme 30 may perform a mixture of no SIB reading/decoding along with reading/decoding one or more SIBs 28 during the continuous SIB decoding period, which may be a set of one or more continuous frames having a time period less than the maximum repetition rate duration 42. In other words, rather than tuning-away and reading/decoding system information for an idle SIM (e.g., SIM$_2$ 38) during the entire maximum repetition rate duration 42, system information component 24 may be configured to allocate only a portion of, or otherwise partition, the maximum repetition rate duration 42 to the idle SIM (e.g., SIM$_2$ 38) for SIB reading/decoding and the remainder to the active SIM (e.g., SIM$_1$ 36) so as to not drop the active call. In such aspects, system information component 24 may allocate and distribute continuous SIB decoding period over one or more maximum repetition rate durations 42 to allow for decoding of all system information (e.g., SIBs 28).

In some non-limiting aspects, MIB 26 may also include or provide a scheduling block for a particular SIB in addition to SIB decoding schedule 32. As such, system information component 24 may be configured to update the one or more distributed SIB decoding schemes 30 once the scheduling block for the particular SIB is obtained and the maximum repetition rate duration 42 is updated accordingly. Further, a continuous SIB decoding period may be greater in duration than the maximum repetition rate duration 42. In such a scenario, system information component 24 may be configured to set or allocate a minimum decode time for the active SIM (e.g., SIM$_1$ 36) to effectively maintain the data call even if the overall time is longer than the maximum repetition rate duration 42.

In additional aspects, as mentioned above, UE 12 may include communication component 34, which may be configured to transmit and receive wireless communications, including receiving and decoding MIB 26 and one or more SIBs 28 from one or more network entities (e.g., first network entity 14 and second network entity 16). Additionally, communication component 34 may operate with system information component 24 to perform a cell reselection procedure for one or both of SIM$_1$ 36 and SIM$_2$ 38.

In some aspects, UE 12 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, a device for Internet-of-Things, a wireless transmit/receive unit, or some other suitable terminology.

Additionally, first network entity 14 and second network entity 16 may be a macrocell, small cell, picocell, femtocell, access point, relay, Node B, mobile Node B, UE (e.g., communicating in peer-to-peer or ad-hoc mode with UE 12), or substantially any type of component that can communicate with UE 12 to provide wireless network access at the UE 12.

Figure 2:
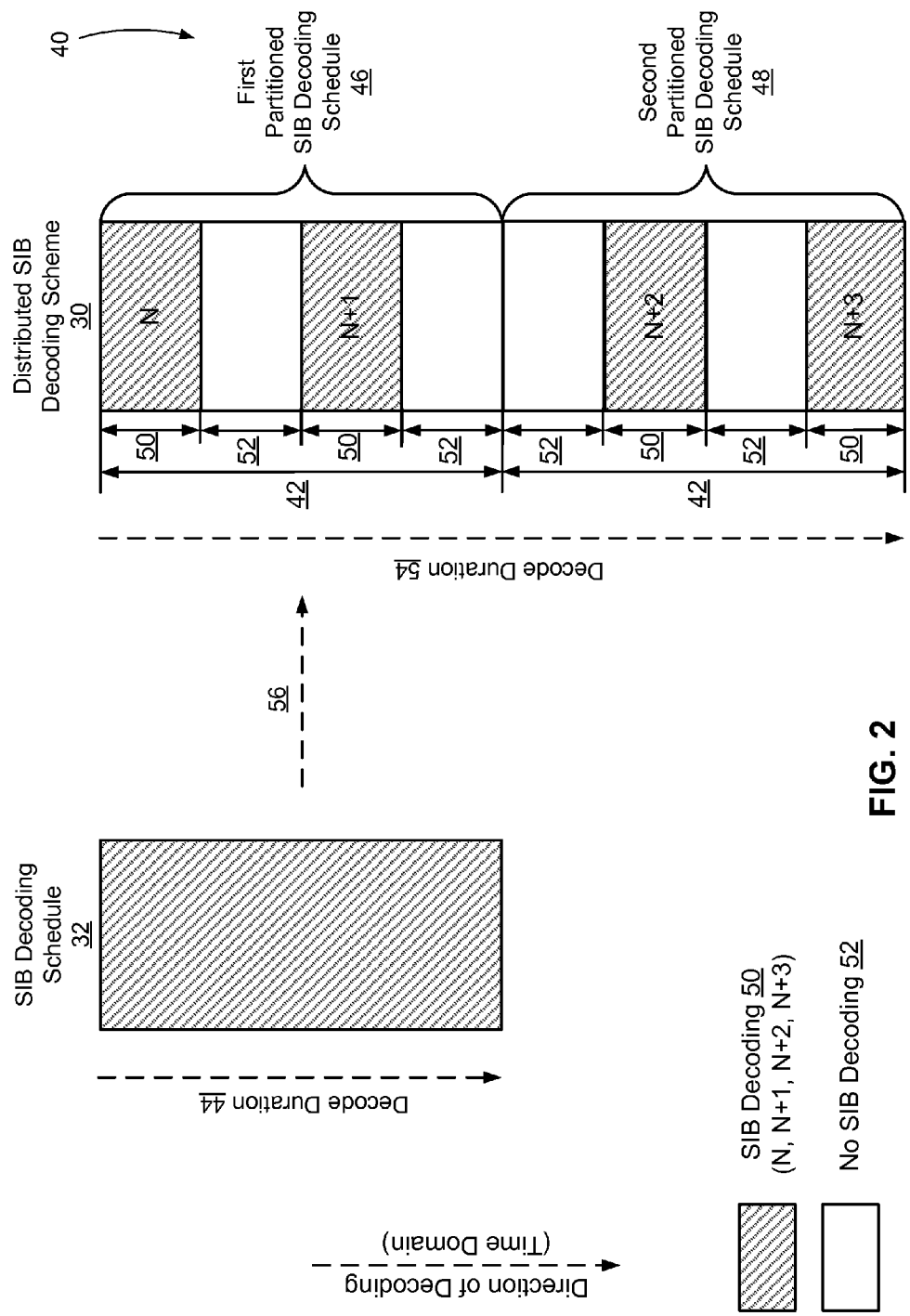
FIG. 2 is a conceptual diagram of a decoding scheme in accordance with an aspect of the present disclosure, e.g., according to FIG. 1.

Referring to FIG. 2, in one non-limiting example, a distributed SIB decoding scheme 30 according to the aspects described herein provides or otherwise enables an idle SIM (e.g., SIM$_2$ 38) to perform decoding of system information (e.g., SIBs) while conducting a data call on an active SIM (e.g., SIM$_1$ 36). Specifically, as discussed above, system information component 24 (FIG. 1) generates distributed SIB decoding scheme 30 based on a resource allocation adjustment 56 to SIB decoding schedule 32 provided by a network entity to include a first partitioned SIB decoding schedule 46 and a second partitioned SIB decoding schedule 48. In such aspects, the SIB decoding schedule 32 may be provided by or determined from a MIB (e.g., MIB 26, FIG. 1) provided by the network entity.

In an aspect, rather than tuning away for prolonged periods of time at blocks N, N+1, N+2 and N=3, the distributed SIB decoding scheme 30 may permit allocation of resources (e.g., frames) in such a manner so as to ensure adequate resources allocated to both the data call and the decoding of system information. As such, a balanced resource allocation scheme may prevent significant degradations in both the data call and the decoding of system information.

The UE may initially receive a SIB decoding schedule 32 from a network entity (e.g., first network entity 14, FIG. 1). Specifically, the UE may obtain or determine the SIB decoding schedule 32 based on the MIB 26 received from the network entity. In one example, for instance, SIB decoding schedule 32 may include four consecutive continuous SIB decoding periods, N, N+1, N+2 and N+3 within or during a time period equal to decode duration 44. However, in some aspects, the sequential order of the four consecutive continuous SIB decoding periods in SIB decoding schedule 32 may not be the same as, or otherwise ordered in a similar sequential manner, as in distributed SIB decoding scheme 30. In other words, N, N+1, N+2 and N+3 may be arranged or scheduled differently in distributed SIB decoding scheme 30 as compared to SIB decoding schedule 32.

That is, the SIB decoding schedule 32 may allocate all communication resources (e.g., frames) to the decoding of system information on an idle SIM during, for example, maximum repetition rate duration 42 or a duration in time corresponding to the length of the maximum repetition rate duration 42. However, the UE 12 may encounter the risk of experiencing degradations in a data call on an active or first SIM 36 based on the decoding of the system information for second SIM 38 according to the SIB decoding schedule 32 due to the extended period of tuning away from the data call.

As such, UE 12 may, according to the operation of system information component 24 (FIG. 1), determine distributed SIB decoding scheme 30 for balanced allocation of communication resources between the first SIM 36 and the second SIM 38. Over the decode duration 44 of SIB decoding schedule 32, the distributed SIB decoding scheme 30 may decrease radio frequency resources (e.g., frames) devoted or allocated to system information decoding for an idle SIM, e.g., second SIM 38, while increasing or allocating the radio frequency resources (e.g., frames) not allocated to the system information decoding to be used for maintaining a data call on an active SIM, e.g., first SIM 36. For example, the reception or decoding of MIB 26 by UE 12 may trigger system information component 24 to generate at least one distributed SIB decoding scheme 30.

In such aspects, the decode duration 44 corresponding to the SIB decoding schedule 32 may be shorter in time compared to the decode duration 54 corresponding to the distributed SIB decoding scheme 30. In other words, it may take the distributed SIB decoding scheme 30 longer to decode the SIBs (e.g., SIBs 28) received from the network entity than it may based on the SIB decoding schedule. For example, by allocating or relocating radio frequency resources between the active SIM, e.g., first SIM 36 and the idle SIM, e.g., second SIM 38, the decode duration 54 of the distributed SIB decoding scheme 30 may be twice as long in time as the decode duration 44 of the SIB decoding schedule due to the partitioning of the SIB decoding 50 within the distributed SIB decoding scheme 30. Although the decode duration 54 of distributed SIB decoding scheme 30 may be longer than the decode duration 44 of the SIB decoding schedule 32, a UE may be able to maintain a data call on the active SIM while decoding system information on the idle SIM based on the distributed SIB decoding scheme 30, and as opposed to potentially dropping the data call of the active SIM if using the SIB decoding schedule 32.

In an aspect, the distributed SIB decoding scheme 30 may include one or more partitioned SIB decoding schedules 40, such as a first partitioned SIB decoding schedule 46 and a second partitioned SIB decoding schedule 48. As illustrated in FIG. 2, multiple periods of system information decoding, represented as continuous SIB decoding period 50, the sum of which may equate to SIB decoding schedule 32, may be spread across at least two maximum repetition rate durations 42. Accordingly, distributed SIB decoding scheme 30 may attempt to decode one or more SIBs during the separated continuous SIB decoding periods 50 (e.g., N, N+1, N+2, and N+3) based on the combination of the first partitioned SIB decoding schedule 46 and the second partitioned SIB decoding schedule 48. In some aspects, a number of different partitioned SIB decoding schedules may be equal to the extension factor and each partitioned SIB decoding schedule may be used for at least a maximum repetition rate duration 42 prior to switching to a next partitioned SIB decoding schedule for a next maximum repetition rate duration 42.

Further, the UE 12 may perform non-SIB decoding activities during certain periods or blocks of distributed SIB decoding scheme 30, e.g., during blocks associated with no SIB decoding 52. In some aspects, the no SIB decoding 52 blocks and/or periods may be referred to as adjusted continuous SIB decoding periods in that at least some of the time periods originally scheduled for SIB decoding in the SIB decoding schedule 32 have been adjusted to make available for the active SIM (e.g., first SIM). For example, in an aspect, active SIM, e.g., first SIM 36, may perform or maintain a data call during periods of no SIB decoding 52.

As such, in some aspects, the overall time or resources for SIB decoding represented as N, N+1, N+2 and N+3 may sum to be the same amount of time as in the SIB decoding schedule 32, which is a continuous block of time, provided by the network. Additionally, in the aspect illustrated in FIG. 2, in one non-limiting example, the maximum repetition rate duration 42 may be set or determined to be 64 frames. Additionally, as an example, each continuous SIB decoding period 50 may be 16 frames in length. Further, the extension factor value, as described herein with respect to FIG. 1, may be set or equal to two. Accordingly, with an extension factor of two, UE 12 would take twice as long to complete decoding of the system information as compared to decoding based on the network-provided SIB decoding schedule 32.

Further, in an aspect not to be construed as limiting, system information component 24 (FIG. 1) may determine the distributed SIB decoding scheme 30 based on a formulaic procedure. For example, system information component 24 may create one or more masks that determine how to allocate the radio frequency resources. In an aspect, each mask may indicate to perform or to not perform SIB decoding over a number of frames. In an aspect, a mask may be the same as or similar to SIB decoding schedule 32 and/or the partitioned SIB decoding schedule 40.

For instance, where there are K masks, and mask_i (i=1, 2, . . . , K) may be defined as:

At SFN y, mask_i(y)=1 if (i−1)*T_subblock/K≤mod(y, T_subblock)<(i)*T_subblock/K.

Otherwise, mask_i(y)=0

In such aspects, T_cycle may be the same as or similar to the continuous SIB decoding period 50. For example, T_cycle may be or indicate a number of continuous 10 ms frames that the idle SIM, e.g., second SIM 38, will be allocated the radio frequency resources for SIB decoding before giving the radio frequency resource back to the active SIM, e.g., first SIM 36. The values of T_cycle may be powers of two to complement the fact that system information scheduling repetition periods are in powers of two. For example, T_cycle may be set or equal to 16.

Further, K may be the extension factor value. In such aspects, the distributed SIB decoding scheme 30 having multiple partitioned SIB decoding schedules 40, such as first partitioned SIB decoding schedule 46 and second partitioned SIB decoding schedule 48, may take K times as long as SIB decoding schedule 32 (e.g., the default, non-partitioned SIB scheduling procedure received from the network) to complete the SIB decoding. For instance, in a non-limiting example, K may be set or equal to 2. Additionally, in a non-limiting example of one aspect, (K−1)*T_cycle may be the continuous amount of time, e.g., time periods of no SIB decoding 52, allocated to the active SIM, e.g., first SIM 36, in between continuous SIB decoding periods 50 allocated to the idle SIM, e.g., second SIM 38.

Additional parameters may be derived or determined from the above parameters or from SIB scheduling parameters obtained from MIB 26 or SIBs 28. For example, T_rep, which may be the same as or similar to the maximum repetition rate duration 42, may be the maximum "SIB_REP" (system information block repetition rate) over all scheduled SIBs 28 or SBs (scheduling blocks) in the MIB 26. Further, for instance, N may be determined based on T_rep/T_cycle. Moreover, T_subblock may be determined based on T_rep/(N/K)=T_cycle*K.

In any case, system information component 24 may perform the above-noted algorithm in a procedure that may place a mask (e.g., partitioned SIB decoding schedule 40, FIG. 1) on top of the default SIB decoding schedule (e.g., SIB decoding schedule 32, FIG. 1). Given a default SIB scheduling table, this procedure will further restrict when SIB decoding will be performed. In an aspect, the number of different masks may be K and each mask may be used for at least T_rep frames before switching to the next mask. As a result, the overall SIB decoding schedule may be implemented at the frame level and may be based on the default SIB schedule table according to the one or more masks.

Figure 3:
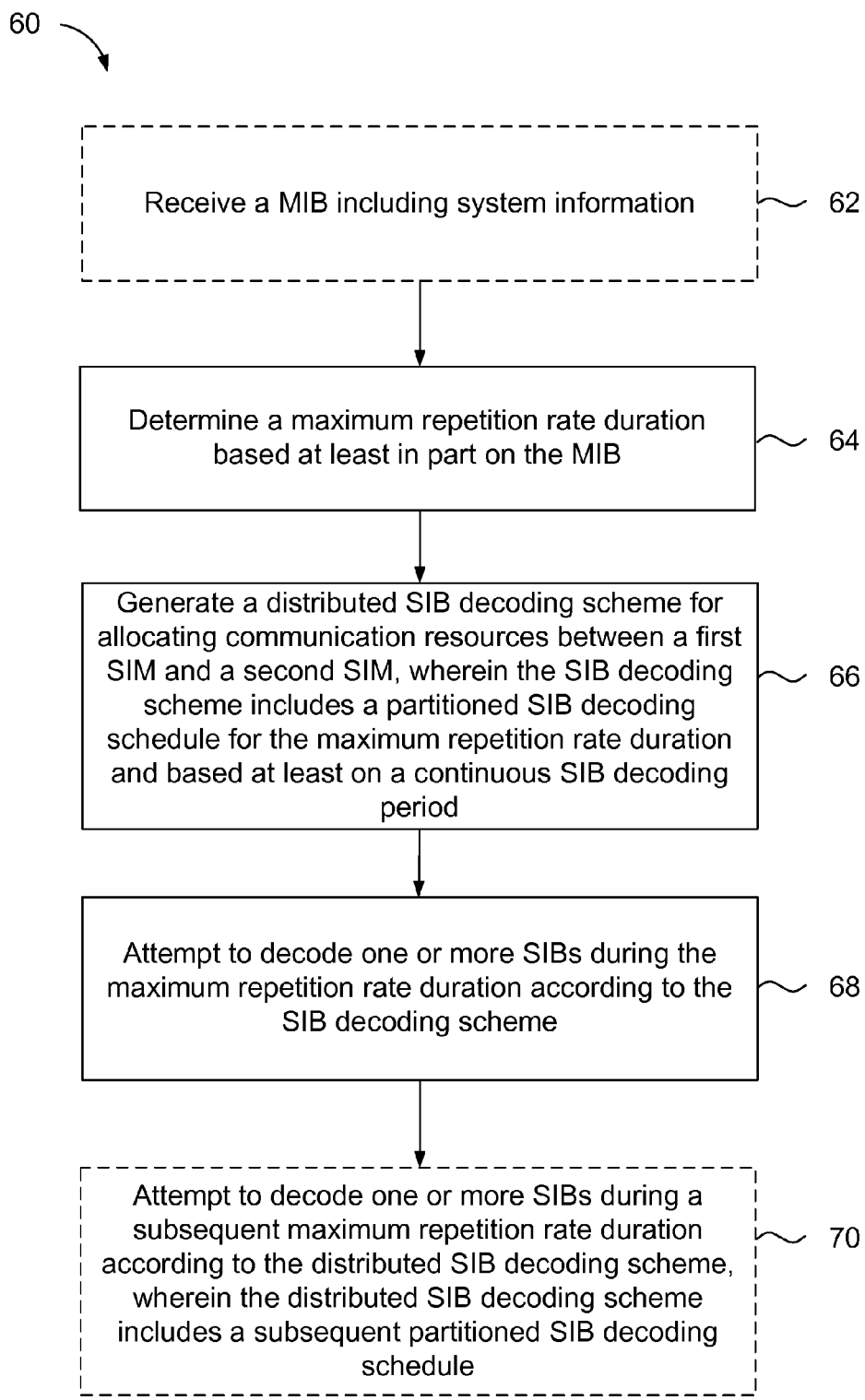
FIG. 3 is a flowchart of an aspect of a method of wireless communication in accordance with an aspect of the present disclosure, e.g., according to FIG. 1.

Referring to FIG. 3, in an operational aspect, a UE such as UE 12 (FIG. 1) may perform one aspect of a method 60 for efficiently decoding system information on one SIM (e.g., $SIM_2$ 38, FIG. 1) while maintaining an active call on another SIM (e.g., $SIM_1$ 36, FIG. 1). While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In an aspect, at block 62, method 60 may optionally include receiving a MIB including system information. For example, as described herein, UE 12 (FIG. 1) may execute at least one of system information component 24 (FIG. 1) and communication component 34 (FIG. 1) to receive a MIB 26 (FIG. 1) including system information (e.g., one or more SIBs 28, FIG. 1). In some aspects, the MIB 26 (FIG. 1) may be broadcast from first network entity 14 (FIG. 1) and/or second network entity 16 (FIG. 1) and received by a transceiver or receiver of communication component 34, which may read and/or decode MIB 26 and forward all or part of the system information to system information component 24.

Further, at block 64, method 60 includes determining a maximum repetition rate duration based at least in part on the MIB. For example, as described herein, UE 12 (FIG. 1) may execute system information component 24 (FIG. 1) to determine a maximum repetition rate duration 42 (FIG. 1) based at least in part on system information read or decoded using MIB 26 by communication component 34 and/or system information component 24. In some aspects, the maximum repetition rate duration may comprise or otherwise indicate a minimum number of frames during which all SIBs 28 (FIG. 1) can be decoded.

At block 66, method 60 includes generating a distributed SIB decoding scheme for allocating communication resources between a first SIM and a second SIM, wherein the distributed SIB decoding scheme includes a partitioned SIB decoding schedule for the maximum repetition rate duration and based at least on a continuous SIB decoding period. For instance, as described herein, UE 12 (FIG. 1) may execute system information component 24 (FIG. 1) to generate a distributed SIB decoding scheme 30 (FIG. 1) including a partitioned SIB decoding schedule 40 (FIG. 1) for the maximum repetition rate duration 42 and based at least on a continuous SIB decoding period 50. In some aspects, the distributed SIB decoding scheme 30 (FIG. 1) allocates one or more continuous SIB decoding periods 50 during the maximum repetition rate duration 42 for decoding the one or more SIBs 28 (FIG. 1).

Moreover, at block 68, method 60 may attempt to decode one or more SIBs during the maximum repetition rate duration according to the SIB decoding scheme. For instance, as described herein, UE 12 (FIG. 1) may execute system information component 24 (FIG. 1) to attempt to decode one or more SIBs 28 (FIG. 1) during the maximum repetition rate duration 42 according to the distributed SIB decoding scheme 30 (FIG. 1).

At block 70, method 60 may optionally include attempting to decode one or more SIBs during a subsequent maximum repetition rate duration according to the SIB decoding scheme and a subsequent SIB decoding scheme, wherein the distributed SIB decoding scheme includes a subsequent partitioned SIB decoding schedule. For example, as described herein, UE 12 (FIG. 1) may execute system information component 24 (FIG. 1) to decode one or more SIBs 28 (FIG. 1) during a subsequent maximum repetition rate duration 42 according to the distributed SIB decoding scheme. In some aspects, the distributed SIB decoding scheme may include a subsequent partitioned SIB decoding schedule (e.g., second partitioned SIB decoding schedule 48 FIG. 2).

Figure 4:
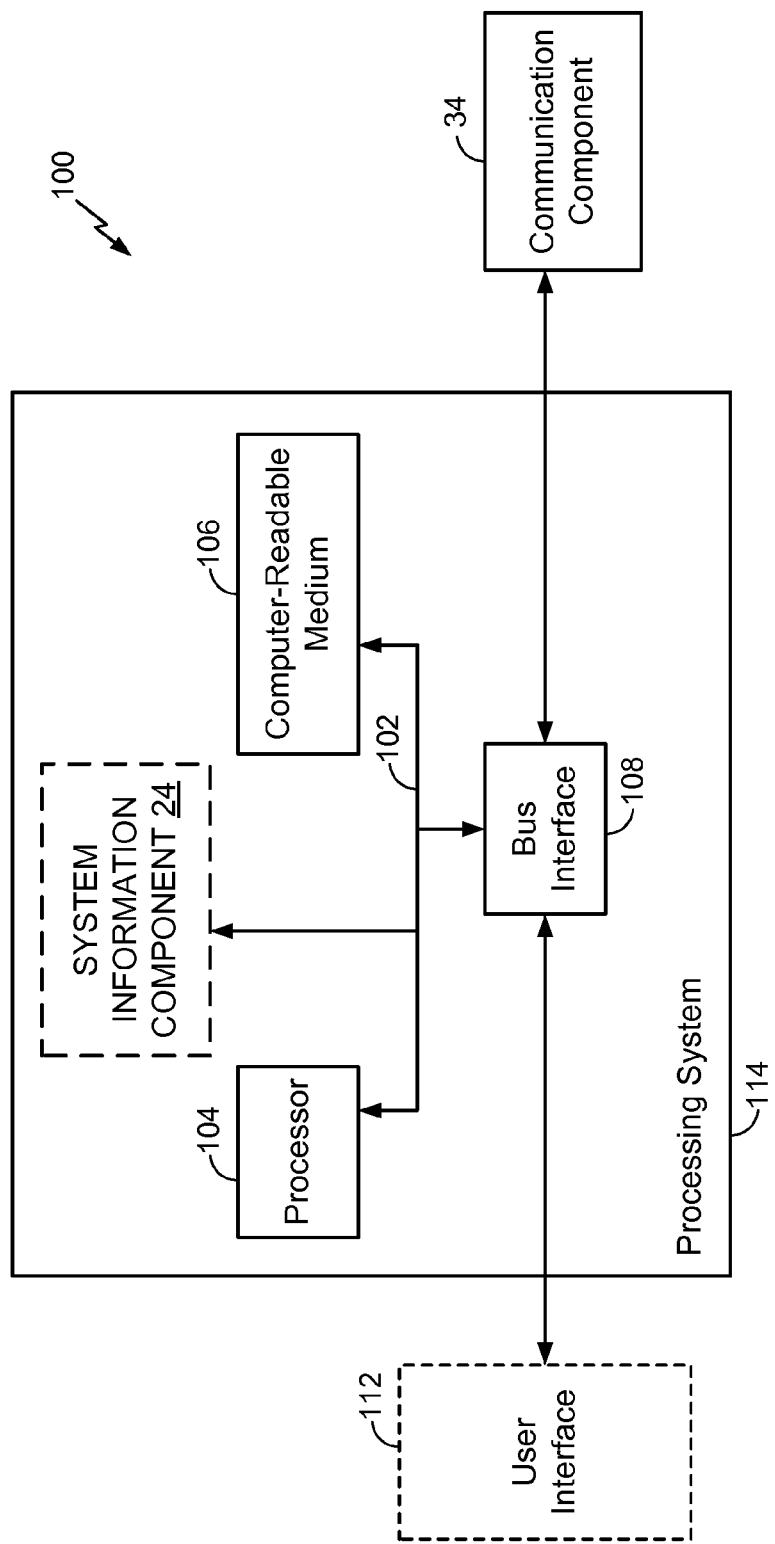
FIG. 4 is a block diagram illustrating an example of a hardware implementation for an apparatus employing a processing system in accordance with an aspect of the present disclosure, e.g., according to FIG. 1.

FIG. 4 is a block diagram illustrating an example of a hardware implementation for an apparatus 100 employing a processing system 114, wherein the apparatus may be the same as or similar to UE 12, or included within UE 12, and includes at least system information component 24 (FIG. 1). For instance, system information component 24 may be implemented as one or more components within processor 104, or as code or instructions stored as computer readable medium 106 and executed by processor 104, or some combination of both. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106, and UE components (e.g., UE 12), such as system information component 24.

The bus 102 may also link various other circuits such as timing sources, peripherals, voltage regulators, and power management circuits, which are well known in the art, and therefore, will not be described any further. A bus interface 108 provides an interface between the bus 102 and a communication component 34. The communication component 34 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Further, system information component 24 (FIG. 1) may be implemented by any one or more of processor 104 and computer-readable medium 106. For example, the processor and/or computer-readable medium 106 may be configured to, via system information component 24 (FIG. 1), to efficiently decode system information on one SIM (e.g., $SIM_2$ 38, FIG. 1) while maintaining an active call on another SIM (e.g., SIM' 36, FIG. 1).

The various concepts presented throughout this disclosure may be implemented across a broad variety of telecommunication systems, network architectures, and communication standards.

Figure 5:
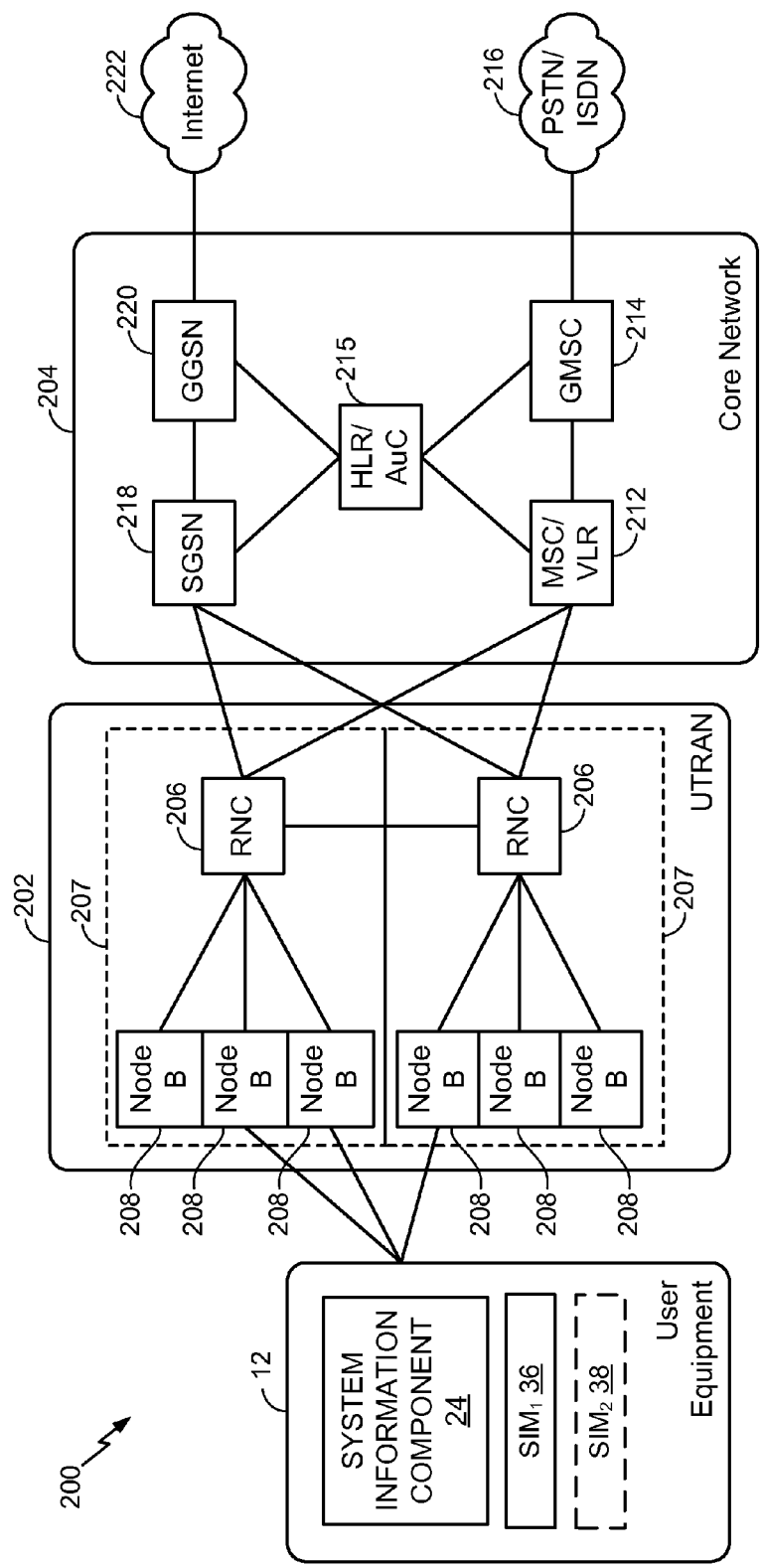
FIG. 5 is a block diagram conceptually illustrating an example of a telecommunications system in accordance with an aspect of the present disclosure, e.g., according to FIG. 1.

Referring to FIG. 5, by way of example and without limitation, the aspects of the present disclosure are presented with reference to a UMTS system 200 employing a W-CDMA air interface in which UE 12 including system information component 24 may operate. A UMTS network includes three interacting domains: a Core Network (CN) 204, a UMTS Terrestrial Radio Access Network (UTRAN) 202, and UE 12. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 12 and a Node B 208 may be considered as including a physical (PHY) layer and a medium access control (MAC) layer. Further, communication between a UE 12 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses.

Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 12 may further include a first SIM 36 and a second SIM 38, which contains a user's subscription information to a network. For illustrative purposes, one UE 12 is shown in communication with a number of the Node Bs 208. The DL, also called the forward link, refers to the communication link from a Node B 208 to a UE 12, and the UL, also called the reverse link, refers to the communication link from a UE 12 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudo-random bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 12. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 12 provides feedback to the node B 208 over the HS-DPCCH to indicate whether it correctly decoded a packet on the downlink.

HS-DPCCH further includes feedback signaling from the UE 12 to assist the node B 208 in taking the right decision in terms of modulation and coding scheme and precoding weight selection, this feedback signaling including the CQI and PCI.

Figure 6:
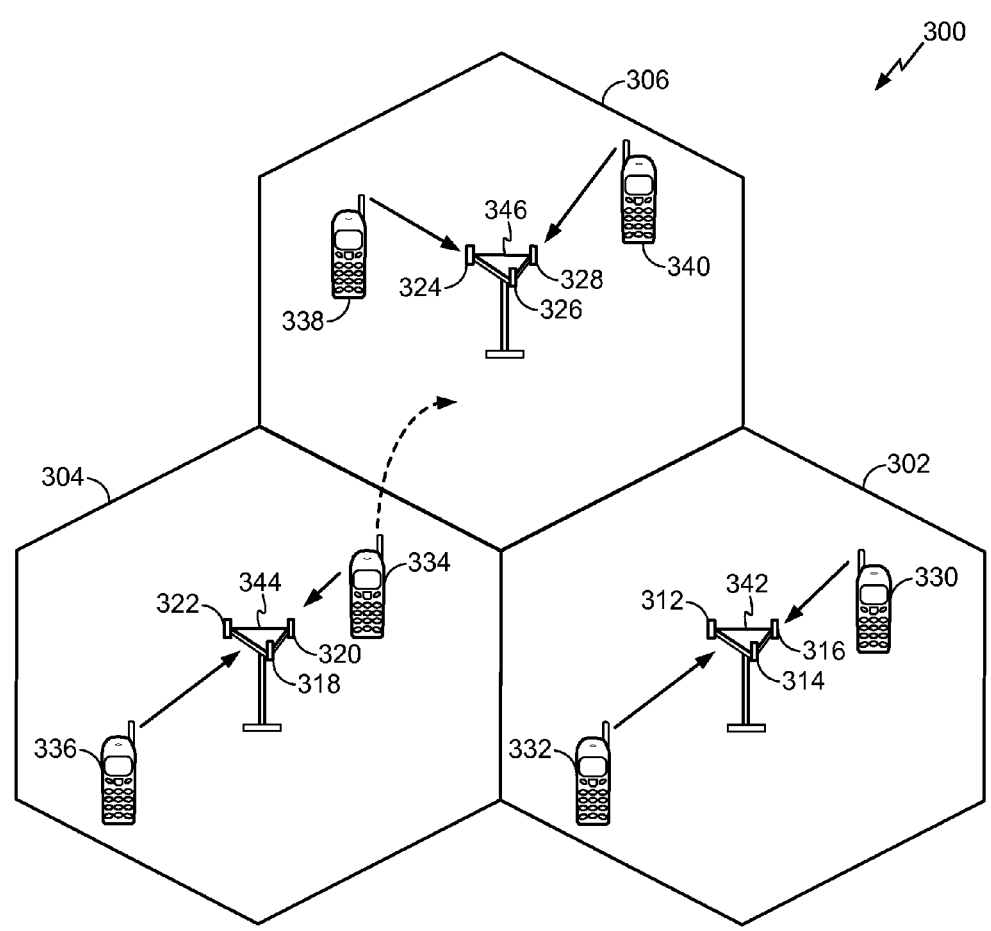
FIG. 6 is a conceptual diagram illustrating an example of an access network in accordance with an aspect of the present disclosure, e.g., according to FIG. 1.

Referring to FIG. 6, an access network 300 in a UTRAN architecture is illustrated in which a UE, such as a UE the same as or similar to UE 12 (FIG. 1) including system information component 24 may operate. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 5) for all the UEs 330, 332, 334, 336, 338, 340 in the respective cells 302, 304, and 306. In an aspect, the UEs 330, 332, 334, 336, 338 and/or 340 may include system information component 24 (FIG. 1).

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 5), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DPCH or fractional downlink dedicated physical channel F-DPCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 6.

Figure 7:
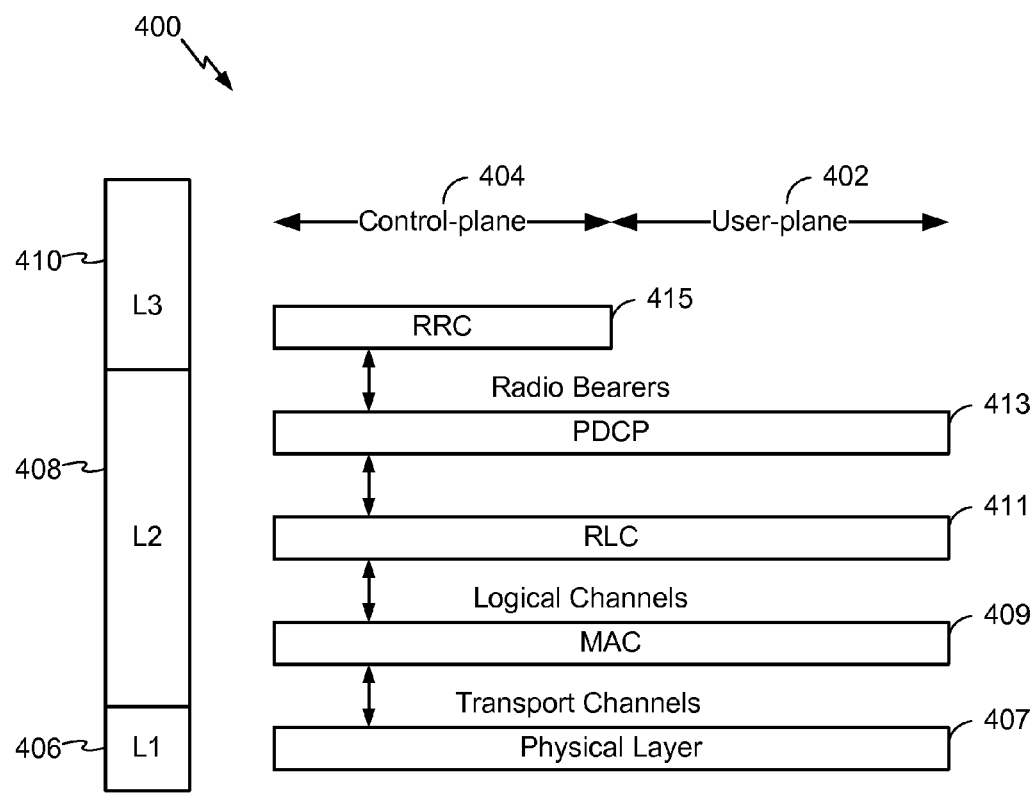
FIG. 7 is a conceptual diagram illustrating an example of a radio protocol architecture for the user and control plane that may be utilized by the user equipment described herein and in accordance with an aspect of the present disclosure, e.g., according to FIG. 1.

Referring to FIG. 7, an example radio protocol architecture 400 relates to the user plane 402 and the control plane 404 of a user equipment (UE) or node B/base station. For example, architecture 400 may be included in a UE such as UE 12 including system information component 24 (FIG. 1). The radio protocol architecture 400 for the UE and node B is shown with three layers: Layer 1 406, Layer 2 408, and Layer 3 410. Layer 1 406 is the lowest lower and implements various physical layer signal processing functions. As such, Layer 1 406 includes the physical layer 407. Layer 2 (L2 layer) 408 is above the physical layer 407 and is responsible for the link between the UE and node B over the physical layer 407. Layer 3 (L3 layer) 410 includes a radio resource control (RRC) sublayer 415. The RRC sublayer 415 handles the control plane signaling of Layer 3 between the UE and the UTRAN.

In the user plane, the L2 layer 408 includes a media access control (MAC) sublayer 409, a radio link control (RLC) sublayer 411, and a packet data convergence protocol (PDCP) 413 sublayer, which are terminated at the node B on the network side. Although not shown, the UE may have several upper layers above the L2 layer 408 including a network layer (e.g., IP layer) that is terminated at a PDN gateway on the network side, and an application layer that is terminated at the other end of the connection (e.g., far end UE, server, etc.).

The PDCP sublayer 413 provides multiplexing between different radio bearers and logical channels. The PDCP sublayer 413 also provides header compression for upper layer data packets to reduce radio transmission overhead, security by ciphering the data packets, and handover support for UEs between node Bs. The RLC sublayer 411 provides segmentation and reassembly of upper layer data packets, retransmission of lost data packets, and reordering of data packets to compensate for out-of-order reception due to hybrid automatic repeat request (HARQ). The MAC sublayer 409 provides multiplexing between logical and transport channels. The MAC sublayer 409 is also responsible for allocating the various radio resources (e.g., resource blocks) in one cell among the UEs. The MAC sublayer 409 is also responsible for HARQ operations.

Figure 8:
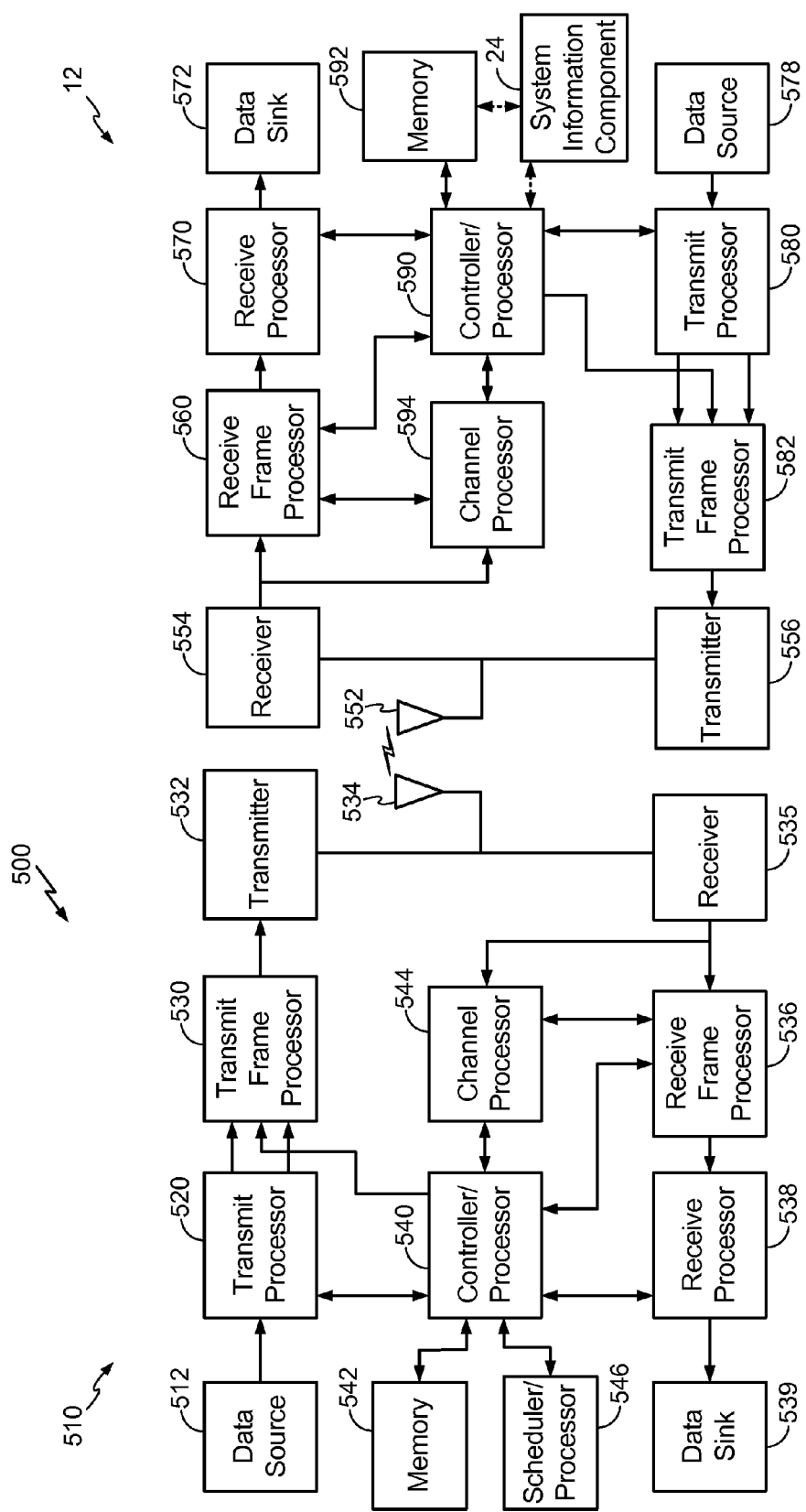
FIG. 8 is a block diagram conceptually illustrating an example of a Node B in communication with a UE in a telecommunications system and in accordance with an aspect of the present disclosure, e.g., according to FIG. 1.

FIG. 8 is a block diagram of a Node B 510 in communication with a UE 12, where the Node B 510 may be the Node B 208 in FIG. 5, and the UE 12 includes system information component 24 in FIG. 1. In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols.

Channel estimates from a channel processor 544 may be used by a controller/processor 540 to determine the coding, modulation, spreading, and/or scrambling schemes for the transmit processor 520. These channel estimates may be derived from a reference signal transmitted by the UE 12 or from feedback from the UE 12. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 12, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 12 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 12 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 12. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 12. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 12, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 12, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of decoding system information, comprising:
    receiving, at a second subscriber identity module (SIM), a master information block (MIB) including scheduling information of one or more system information blocks (SIBs) during cell reselection for the second SIM and an active call for a first SIM, wherein the scheduling information includes a first decode duration;
    determining a maximum repetition rate duration based at least in part on the MIB, wherein the maximum repetition rate duration indicates a minimum number of frames for decoding the one or more SIBs;
    generating a distributed SIB decoding scheme including one or more partitioned SIB decoding schedules and having a second decode duration greater than the first decode duration, wherein the distributed SIB decoding scheme allocates radio frequency resources between the first SIM and the second SIM in response to receiving the MIB, wherein each a partitioned SIB decoding schedule includes one or more continuous SIB decoding periods separated along the maximum repetition rate duration forming at least a portion of the second decode duration; and
    attempting to decode the one or more SIBs during the maximum repetition rate duration according to the distributed SIB decoding scheme.

2. The method of claim 1, wherein the continuous SIB decoding period includes a number of consecutive radio frames allocated for a decoding of the one or more SIBs, and wherein generating the distributed SIB decoding scheme includes allocating one or more radio frames up to the continuous SIB decoding period for the decoding of the one or more SIBs during the maximum repetition rate duration.

3. The method of claim 1, wherein the partitioned SIB decoding schedule includes a SIB decoding bit within one or more radio frames during the continuous SIB decoding period for activating decoding of the one or more SIBs.

4. The method of claim 3, wherein the SIB decoding bit triggers decoding of the one or more SIBs during the continuous SIB decoding period.

5. The method of claim 1, wherein the maximum repetition rate duration includes a time interval equal to a value of a number of radio frames between repetitions of a SIB from the one or more SIBs.

6. The method of claim 1, wherein receiving the MIB further comprises receiving the MIB including a SIB decoding schedule providing an initial decoding scheme provided by a network entity.

7. The method of claim 6, wherein a number of partitioned SIB decoding schedules is equal to an extension factor value indicating a period of time during which the SIB decoding scheme completes the decoding relative to the SIB decoding schedule.

8. The method of claim 1, further comprising maintaining a data call associated with one of the first SIM and the second SIM, and wherein the attempting includes attempting to decode the one or more SIBs for a SIM not maintaining the data call.

9. A non-transitory computer-readable medium storing computer executable code for decoding system information, comprising:
 code for receiving, at a second subscriber identity module (SIM), a master information block (MIB) including scheduling information of one or more system information blocks (SIBs) during cell reselection for the second SIM and an active call for a first SIM, wherein the scheduling information includes a first decode duration;
 code for determining a maximum repetition rate duration based at least in part on the MIB, wherein the maximum repetition rate duration indicates a minimum number of frames for decoding the one or more SIBs;
 code for generating a distributed SIB decoding scheme including one or more partitioned SIB decoding schedules and having a second decode duration greater than the first decode duration, wherein the distributed SIB decoding scheme allocates radio frequency resources between the first SIM and the second SIM in response to receiving the MIB, wherein each partitioned SIB decoding schedule includes one or more continuous SIB decoding periods separated along the maximum repetition rate duration forming at least a portion of the second decode duration; and
 code for attempting to decode the one or more SIBs during the maximum repetition rate duration according to the distributed SIB decoding scheme.

10. An apparatus for decoding system information, comprising:
 a memory; and
 a processor coupled to the memory and configured to:
  receive, at a second subscriber identity module (SIM), a master information block (MIB) including scheduling information of one or more system information blocks (SIBs) during cell reselection for the second SIM and an active call for a first SIM, wherein the scheduling information includes a first decode duration;
  determine a maximum repetition rate duration based at least in part on the MIB, wherein the maximum repetition rate duration indicates a minimum number of frames for decoding the one or more SIBs;
  generate a distributed SIB decoding scheme including one or more partitioned SIB decoding schedules and having a second decode duration greater than the first decode duration, wherein the distributed SIB decoding scheme allocates radio frequency resources between the first SIM and the second SIM in response to receiving the MIB, wherein each a partitioned SIB decoding schedule includes one or more continuous SIB decoding periods separated along the maximum repetition rate duration forming at least a portion of the second decode duration; and
  attempt to decode the one or more SIBs during the maximum repetition rate duration according to the distributed SIB decoding period.

11. The apparatus of claim 10, wherein the continuous SIB decoding period includes a number of consecutive radio frames allocated for a decoding of the one or more SIBs, and wherein to generate the distributed SIB decoding scheme, the processor is further configured to allocate one or more radio frames up to the continuous SIB decoding period for the decoding of the one or more SIBs during the maximum repetition rate duration.

12. The apparatus of claim 10, wherein the partitioned SIB decoding schedule includes a SIB decoding bit within one or more radio frames during the continuous SIB decoding period for activating decoding of the one or more SIBs.

13. The apparatus of claim 12, wherein the SIB decoding bit triggers decoding of the one or more SIBs during the continuous SIB decoding period.

14. The apparatus of claim 10, wherein the maximum repetition rate duration includes a time interval equal to a value of a number of radio frames between repetitions of a SIB from the one or more SIBs.

15. The apparatus of claim 10, wherein the processor configured to receive the MIB is further configured to receive the MIB including a SIB decoding schedule providing an initial decoding scheme provided by a network entity.

16. The apparatus of claim 15, wherein a number of partitioned SIB decoding schedules is equal to an extension factor value indicating a period of time during which the SIB decoding scheme completes the decoding relative to the SIB decoding schedule.

17. The apparatus of claim 10, wherein the processor is further configured to maintain a data call associated with one of the first SIM and the second SIM, and wherein to attempt to decode the one or more SIBS, the processor is further configured to attempt to decode the one or more SIBs for a SIM not maintaining the data call.

* * * * *